United States Patent
Allgayer et al.

(10) Patent No.: US 10,239,379 B2
(45) Date of Patent: Mar. 26, 2019

(54) METHOD FOR DETERMINING AN ACTUAL LEVEL OF A VEHICLE

(71) Applicant: AUDI AG, Ingolstadt (DE)

(72) Inventors: Andreas Allgayer, Denkendorf (DE); Paul Spannaus, Ingolstadt (DE); Julia Franz, Ingolstadt (DE); Philipp Knuth, Ingolstadt (DE)

(73) Assignee: Audi AG, Ingolstadt (DE)

( * ) Notice: Subject to any disclaimer, the term of this patent is extended or adjusted under 35 U.S.C. 154(b) by 212 days.

(21) Appl. No.: 15/255,959

(22) Filed: Sep. 2, 2016

(65) Prior Publication Data

US 2017/0066298 A1    Mar. 9, 2017

(30) Foreign Application Priority Data

Sep. 3, 2015    (DE) ........................ 10 2015 011 517

(51) Int. Cl.
| | |
|---|---|
| *B60W 40/12* | (2012.01) |
| *B60G 17/015* | (2006.01) |
| *B60G 17/018* | (2006.01) |
| *B60G 17/019* | (2006.01) |
| *B60R 16/023* | (2006.01) |
| *B60G 17/0165* | (2006.01) |

(52) U.S. Cl.
CPC ....... *B60G 17/0182* (2013.01); *B60G 17/019* (2013.01); *B60G 17/0155* (2013.01); *B60G 17/0165* (2013.01); *B60R 16/0232* (2013.01); *B60W 40/12* (2013.01)

(58) Field of Classification Search
None
See application file for complete search history.

(56) References Cited

U.S. PATENT DOCUMENTS

| | | | | |
|---|---|---|---|---|
| 4,616,848 A | * | 10/1986 | Sugasawa | B60G 17/0165 180/41 |
| 4,770,438 A | * | 9/1988 | Sugasawa | B60G 17/0165 180/169 |

(Continued)

FOREIGN PATENT DOCUMENTS

| | | |
|---|---|---|
| DE | 40 03 766 A1 | 8/1991 |
| DE | 196 26 398 A1 | 1/1997 |

(Continued)

*Primary Examiner* — Nicholas K Wiltey
(74) *Attorney, Agent, or Firm* — Henry M. Feiereisen LLC

(57) ABSTRACT

A method for determining an actual level of a vehicle, includes determining an actual level of the vehicle as a function of a distance between at least one wheel of the vehicle and a superstructure of the vehicle, wherein the distance is determined by means of a signal detected by at least one chassis sensor, wherein the signal includes at least signal portions that correspond to an own movement of the vehicle and signal portions that correspond to an excitation by a road on which the vehicle actually drives; filtering the signal portions corresponding to the own movement of the vehicle out of the signal detected by the at least one chassis sensor by means of a filter function; calculating the actual level of the vehicle from a difference between the filtered signal without the signal portions that correspond to the own movement of the vehicle and the signal detected by the at least one chassis sensor.

10 Claims, 5 Drawing Sheets

(56) References Cited

U.S. PATENT DOCUMENTS

| | | | | |
|---|---|---|---|---|
| 5,044,455 A * | 9/1991 | Tecco | B60G 99/002 | 180/89.13 |
| 5,184,841 A * | 2/1993 | Pischke | B60G 17/018 | 267/64.28 |
| 5,199,737 A * | 4/1993 | Huang | B60G 17/0165 | 280/5.512 |
| 5,242,190 A * | 9/1993 | Morris | B60G 17/019 | 280/5.503 |
| 5,301,111 A * | 4/1994 | Utsui | B60G 17/0157 | 280/5.507 |
| 5,332,061 A * | 7/1994 | Majeed | B60K 5/1283 | 180/312 |
| 5,393,087 A * | 2/1995 | Taniguchi | B60G 17/0155 | 280/5.514 |
| 5,430,647 A * | 7/1995 | Raad | B60G 17/016 | 180/41 |
| 5,444,621 A * | 8/1995 | Matsunaga | B60G 17/0165 | 280/5.518 |
| 5,497,324 A * | 3/1996 | Henry | B60G 17/0157 | 280/5.503 |
| 5,719,565 A | 2/1998 | Tsuno et al. | | |
| 5,740,039 A * | 4/1998 | Hirahara | B60G 17/018 | 701/37 |
| 5,760,938 A * | 6/1998 | Hodge | G01B 11/00 | 33/288 |
| 6,058,340 A * | 5/2000 | Uchiyama | B60G 17/0165 | 280/5.514 |
| 6,292,759 B1 * | 9/2001 | Schiffmann | B60T 8/172 | 340/440 |
| 6,616,150 B2 * | 9/2003 | Reisinger | B60G 17/018 | 280/5.514 |
| 6,847,874 B2 * | 1/2005 | Stiller | B60G 17/018 | 280/5.5 |
| 8,116,939 B2 * | 2/2012 | Kajino | B60G 17/0157 | 701/37 |
| 8,737,183 B1 * | 5/2014 | Hyde | G11B 5/455 | 360/75 |
| 9,440,508 B2 * | 9/2016 | Lachica | B60G 17/0165 | |
| 2001/0004147 A1 * | 6/2001 | Reisinger | B60G 17/018 | 280/5.507 |
| 2003/0088349 A1 * | 5/2003 | Schubert | B60R 21/013 | 701/36 |
| 2004/0015279 A1 * | 1/2004 | Barron | B60G 17/015 | 701/37 |
| 2004/0122580 A1 * | 6/2004 | Sorrells | G07C 5/008 | 701/80 |
| 2005/0004750 A1 * | 1/2005 | Huddle | G01C 19/58 | 701/510 |
| 2005/0090956 A1 * | 4/2005 | Ogawa | B60G 17/0165 | 701/37 |
| 2005/0173173 A1 * | 8/2005 | Clare | B60K 23/0808 | 180/197 |
| 2005/0242532 A1 * | 11/2005 | Deo | B60G 13/005 | 280/5.5 |
| 2007/0021886 A1 * | 1/2007 | Miyajima | B60G 17/019 | 701/37 |
| 2007/0158920 A1 * | 7/2007 | Delaney | B60G 17/0195 | 280/5.514 |
| 2007/0208793 A1 * | 9/2007 | Koyanagi | H03H 17/06 | 708/300 |
| 2007/0229240 A1 * | 10/2007 | Yasuda | B60C 23/04 | 340/442 |
| 2008/0023927 A1 * | 1/2008 | Kim | B60G 17/0155 | 280/5.514 |
| 2008/0099967 A1 * | 5/2008 | Spratte | G01D 5/145 | 267/140.14 |
| 2008/0252025 A1 * | 10/2008 | Plath | B60G 9/003 | 280/5.514 |
| 2009/0105921 A1 * | 4/2009 | Hanatsuka | B60G 17/0165 | 701/80 |
| 2009/0228178 A1 * | 9/2009 | Jess | F02D 41/0225 | 701/54 |
| 2009/0319123 A1 | 12/2009 | Nardi et al. | | |
| 2010/0049394 A1 * | 2/2010 | Ammon | B60G 17/0165 | 701/31.4 |
| 2010/0228422 A1 * | 9/2010 | Gartner | B60G 17/0165 | 701/31.4 |
| 2010/0289460 A1 * | 11/2010 | Otake | H02P 9/04 | 322/19 |
| 2010/0320703 A1 * | 12/2010 | Lin | B60G 17/018 | 280/5.507 |
| 2011/0035105 A1 * | 2/2011 | Jolly | B60G 17/015 | 701/37 |
| 2011/0112740 A1 * | 5/2011 | Hashimoto | F02D 17/02 | 701/70 |
| 2011/0128071 A1 * | 6/2011 | Fukusen | H03H 11/1291 | 327/554 |
| 2011/0160960 A1 | 6/2011 | Kajino et al. | | |
| 2012/0053791 A1 * | 3/2012 | Harada | B60G 17/08 | 701/38 |
| 2012/0136621 A1 * | 5/2012 | Inomata | B61L 25/025 | 702/143 |
| 2013/0060423 A1 * | 3/2013 | Jolly | B60G 17/0152 | 701/38 |
| 2013/0311044 A1 * | 11/2013 | Tamaizumi | B62D 5/0463 | 701/42 |
| 2014/0195112 A1 * | 7/2014 | Lu | B60G 17/015 | 701/37 |
| 2014/0297117 A1 * | 10/2014 | Near | H02K 5/12 | 701/37 |
| 2014/0297119 A1 * | 10/2014 | Giovanardi | F15B 13/0444 | 701/38 |
| 2015/0012160 A1 * | 1/2015 | Tsutsumi | B60L 15/20 | 701/22 |
| 2015/0273972 A1 * | 10/2015 | Plath | B60G 17/019 | 701/37 |
| 2015/0298575 A1 * | 10/2015 | Nakatsu | B60L 15/2045 | 701/22 |
| 2015/0352921 A1 * | 12/2015 | Dames | B60G 17/08 | 280/5.514 |
| 2016/0023530 A1 * | 1/2016 | Guest | B60G 17/0165 | 701/38 |
| 2016/0229252 A1 * | 8/2016 | Lu | B60G 17/0165 | |
| 2016/0280035 A1 * | 9/2016 | Gohrle | B60G 17/0165 | |
| 2017/0066298 A1 * | 3/2017 | Allgayer | B60W 40/12 | |
| 2017/0240017 A1 * | 8/2017 | Vandersmissen | B60G 17/0164 | |
| 2017/0282996 A1 * | 10/2017 | Murakami | B60G 17/016 | |
| 2018/0065640 A1 * | 3/2018 | Barthel | B60T 8/172 | |

FOREIGN PATENT DOCUMENTS

DE 10 2008 058 152 A1 7/2009
EP 2 279 088 B1 11/2012

* cited by examiner

METHOD FOR DETERMINING AN ACTUAL LEVEL OF A VEHICLE

CROSS-REFERENCES TO RELATED APPLICATIONS

This application claims the benefit of German Patent Application, Serial No. 10 2015 011 517.0, filed Sep. 3, 2015, pursuant to 35 U.S.C. 119(e), the disclosure of which is incorporated herein by reference.

BACKGROUND OF THE INVENTION

The invention relates to a method for determining an actual level of a vehicle.

The following discussion of related art is provided to assist the reader in understanding the advantages of the invention, and is not to be construed as an admission that this related art is prior art to this invention.

For controlling a mechatronic system for regulating a chassis of a motor vehicle, with which for example an air suspension, an active roll stabilization and/or a damper regulation can be implemented, usually an actual position of a superstructure of the motor vehicle relative to the tires of the motor vehicle has to be taken into account by which the position or a height, i.e., the level of the motor vehicle is described. For determining the level of a motor vehicle at least one sensor is used depending on the configuration of the mechatronic system for regulating the chassis of the vehicle, which sensor is usually referred to as vertical position sensor, height sensor, positional sensor and/or a spring travel sensor.

It would be desirable and advantageous to provide an improved method for determining an actual level of a vehicle to obviate prior art shortcomings.

SUMMARY OF THE INVENTION

According to one aspect of the present invention, a method for determining an actual level of a vehicle is includes determining an actual level of the vehicle as a function of a distance between at least one wheel of the vehicle and a superstructure of the vehicle wherein the distance is determined by means of a signal detected by at least one chassis sensor, said signal including at least signal portions that correspond to an own movement of the vehicle and signal portions that correspond to an excitation by a road on which the vehicle actually drives; filtering the signal portions corresponding to the own movement of the vehicle out of the signal detected by the at least one chassis sensor by means of a filter function; calculating the actual level of the vehicle from a difference between the filtered signal without the signal portions that correspond to the own movement of the vehicle and the signal detected by the at least one chassis sensor The disclosed method serves in particular for determining an actual level, i.e., a vertical position, of a vehicle during a drive on a course, in particular an even course. Hereby it is provided that a signal determined by a sensor, for example a spring travel sensor, which describes or includes an effect of an uneven course on the vehicle and also an own movement of the vehicle, is filtered so that only the portions due to the effect of the uneven road remain in the signal. It is further provided that the filtered signal is used to calculate a difference between the filtered signal and a corresponding raw signal provided by the chassis sensor and to conclude from the calculated difference the actual level of the vehicle.

The term level of a vehicle in the context of the present invention means a height of a vehicle superstructure relative to a wheel carrier of a respective vehicle.

The term own movement of a vehicle in the context of the present invention means a movement of the superstructure of a respective vehicle relative to the chassis of the vehicle, wherein the movement occurs in reaction to an excitement of the chassis caused by the road on which the vehicle drives.

The term filter function in the context of the present invention means a mathematical function for processing signals that is suited for transforming respective signals according to specific instructions and for example to extract certain signal components of a respective signal.

The disclosed method in particular provides that from raw data of the at least one chassis sensor, for example for a respective mechatronic system for regulating or setting a chassis of a respective vehicle, information required therefore is obtained. Regarding the mechatronic system for regulating the chassis, usually for adjusting a superstructure of the vehicle, raw data of a speed of a wheel compression are used for a damper regulation. For implementing a roll stabilization an air suspension or an active spring mount adjustment, i.e., a so-called active body control, an absolute position of the motor vehicle also has to be determined. For abstraction and extraction of respective required information from the respective raw data determined by the at least one chassis sensor at least one filtering for example a high-pass, low-pass, band pass filtering and/or an adaptive filtering, for example a Wiener filtering or Kalman filtering is used in a digital data processing.

With the disclosed method an absolute position or absolute height of the motor vehicle, usually the superstructure of the motor vehicle, is determined by using at least one spring travel sensor, which is also possible even in the case of very strong excitation of the superstructure and/or the chassis of the vehicle caused by a respective road on which the vehicle drives. When knowing the absolute position or the absolute height it is provided that the system for regulating the chassis is adjusted to the position or the height of the chassis. Hereby the disclosed method can be used for example for regulating a chassis that is configured as an air suspension chassis, for regulating a roll stabilization of the chassis and/or for adjusting or changing a spring mount within the framework of an active control of the superstructure.

The disclosed method is in particular based on the circumstance that the vehicle level, i.e., the actual level of the vehicle, is determined independent of concrete operating parameters, for example vehicle-type dependent operating parameters of the chassis so that for example information regarding the stiffness of at least one spring and/or a component of the chassis are not required. Furthermore information regarding an actual mass of the motor vehicle which is dependent on its loading is also not required. Correspondingly the disclosed method is independent of a type or derivative of a respective motor vehicle and thus is generally applicable and can be used fast and simple in different vehicles without intensive parameterizing effort.

Thus a signal-based and vehicle independent determination of the vehicle level can be achieved independent of an excitation of respective chassis components by a road on which the vehicle actually drives.

According to another advantageous feature of the invention, the level of a vehicle, i.e., usually an average distance between the tires or a wheel carrier of the vehicle and the superstructure of the vehicle, is determined by taking raw signals of at least one spring travel or height sensor into account. Hereby a determination of the vehicle height is also provided by filtering also in the case of a strong excitation caused by a respective road even though on one hand a spectrum of respective raw signals that are usually used for this purpose and from which the vehicle height can be deduced, and on the other hand an interfering signal spectrum are at least partially located in an overlapping frequency spectrum or frequency range. The disclosed method allows estimating the signal spectrum of the frequency by which the motor vehicle is excited during its drive over the respective road for example by taking a speed of the motor vehicle into account, wherein it has to be taken into account that a vertical vibration with which the vehicle is excited during driving over a respective road increases in the frequency range with increasing speed with which the vehicle drives over a respective obstacle. Thus compared to a model-based description of the movement of the superstructure of the vehicle in which for example a Kalman filtering or a state space filtering is performed for regulation, a significantly reduced or no parameterization effort is required for the presented method. In addition a parameterization of a potentially or additionally spring-damper-mass-analogous model is not required because in such a analogous model the mass has to be estimated in case of a variable mass of the motor vehicle.

According to another advantageous feature of the invention, the at least one filter function is selected in dependence on a frequency range of a movement of at least one chassis component of the vehicle.

The presented method is based on the assumption that the lifting and lowering speed of a respective chassis system are known so that a system frequency range of a relative movement between the vehicle superstructure and the wheel of a respective vehicle, caused by the intervention of an active chassis system, can thus be assumed to be constant. A constant frequency range enables an estimation of filter coefficients of a respective filter function of arbitrary order by means of a coefficient determination method.

The determination of filter coefficients by means of a coefficient determination can for example be performed in the sense of a filter configuration according to Butterworth, Chebyseh, Bessel or any further technically appropriate filter function. Hereby the filter configuration requires as significant variable a so-called cutoff or corner frequency. This corner frequency separates a damped from an undamped signal portion in the frequency range. The type of coefficient determines the separation sharpness and an order of a respective filter and a degree of the damping on the cutoff frequency. When calculating discrete signals on a digitally calculating control device the filter coefficients have to be converted from an analog filter configuration into a digital filter configuration. Thus a sampling frequency or a computing step of a respective software part has to be taken into account when determining a respective cutoff frequency to be used which software part executes a respective filter function.

A filter function determined with the presented method calculates or filters a respective signal without forming average values. This means a filter function provided according to the presented method calculates or filters a respective signal without average values so that a own movement of a chassis system is removed from the respective signal. By forming a difference from a signal filtered in this way, i.e., a signal from which an own movement of the vehicle caused by a deflection of a chassis system of a respective vehicle was calculated out or filtered out, and a corresponding raw signal, the presented method enables concluding directly to a respective absolute vehicle height, i.e., an actual vehicle height.

According to another advantageous feature of the invention, the filter function is selected so that in addition the signal portions that correspond to extended unevenesses on the road on which the vehicle actually drives are filtered out of the signal detected by the at least one chassis sensor.

In order to take only actual influences of road unevenesses into account for the determination of the actual vehicle level it is provided that global, i.e., extended changes or unevenesses which effect the vehicle over a relatively long period of time, are not taken into account. For this for example a high-pass filter can be used which only takes fast signal changes or high-frequency portions, for example faster than 1 Hz, into account and ignores all slow frequency portions.

According to another advantageous feature of the invention, the signal portions which are filtered out from the signal detected by the at least one chassis filter, are frequency portions that are selected so that a respective filtered signal is calculated without using an averaging function.

By using a frequency based filter which uses defined frequency portions for calculating a corresponding filtered signal and discards other frequency portions defined signals, in particular those that correspond to an own movement of the vehicle can be selectively excluded and distorting averaging functions which integrate over all signal portions, i.e., also unwanted signal portions, can be avoided.

According to another advantageous feature of the invention, the difference formed between the filtered signal and the signal detected by the at least one chassis sensor is smoothed by means of a smoothing function in order to take the system inertia of a chassis system of the chassis into account.

In order to for example control mechanical damper adjuster a signal is required that corresponds to an operating range of respective damper adjusters of a vehicle. This means that for controlling a damper adjuster that can for example maximally be deflected ten times per second a signal should be used that does not include signal portions that are faster than 10 Hz. Correspondingly it is conceivable that a signal that is calculated according to the presented method is smoothed so that the signal is only left with signal portions up to maximally 10 Hz in order to control respective damper adjusters.

According to another advantageous feature of the invention, the at least one filter function is adjusted by means of at least one adjustment factor that depends on respective filter coefficients of the at least one filter function so that the correspondingly formed difference optimally approximates an ideal signal.

It is conceivable that a respective filter function selected for performing the presented method is adjusted to its specific task, i.e., the extraction of signal portions that correspond to an own movement of a respective vehicle, in order to achieve a most exact result. For this purpose the filter function can be adjusted via set point variables such as for example a "gain".

According to another advantageous feature of the invention, at least one filter function is selected from the following list of filter functions as the at least one filter function: Butterworth filter, Chebyshev filter, adaptive filter, Wiener filter, Kalman filter, band-pass filter, low-pass filter and high-pass filter and in addition any other technically appropriate mathematical function for extracting signal portions from a signal.

According to another aspect of the invention a vehicle includes a control device configured to determine an actual level of the vehicle via a distance between at least one wheel of the vehicle and a superstructure of the vehicle and to determine the distance by means of a signal detected by at least one chassis sensor, wherein the signal includes at least signal portions which correspond to an own movement of the vehicle and signal portions that correspond to an excitation by a road on which the vehicle actually drives; wherein the control device is further configured to filter the signal portions of the own movement of the vehicle out of the signal detected by the at least one chassis sensor by means of at least one filter function and to determine the actual level of the vehicle from a difference between the filtered signal without the signal portions that correspond to the own movement of the vehicle and the signal detected by the at least one chassis sensor and to provide the actual level of the vehicle to a control function of at least one component of the vehicle.

According to another advantageous feature of the invention, the control device is configured to provide the actual level of the vehicle to a level regulation for adjustment according to a predetermined set point value in order to select a lift or lower speed of the level regulation to be set correspondingly.

In particular when driving on very uneven roads such as for example on a cobble stone road a fast and precise setting of a level regulation is required. Accordingly it is provided that the level regulation is fast and simple provided with an actual value of the chassis level according to the resented method by a control device.

According to another aspect of the invention a control device for installation in a vehicle is configured to determine an actual level of the vehicle via a distance between at least one wheel of the vehicle and a superstructure of the vehicle and to determine the distance by means of a signal detected by at least one chassis sensor, wherein the signal includes at least signal portions which correspond to an own movement of the vehicle and signal portions that correspond to an excitation by a road on which the vehicle actually drives; wherein the control device is further configured to filter the signal portions of the own movement of the vehicle out of the signal detected by the at least one chassis sensor by means of at least one filter function and to determine the actual level of the vehicle from a difference between the filtered signal without the signal portions that correspond to the own movement of the vehicle and the signal detected by the at least one chassis sensor and to provide the actual level of the vehicle to a control function of at least one component of the vehicle.

According to another advantageous feature of the invention, the component of the vehicle is selected from the following list of components: air suspension chassis, roll stabilizing and/or spring mount adjustment.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
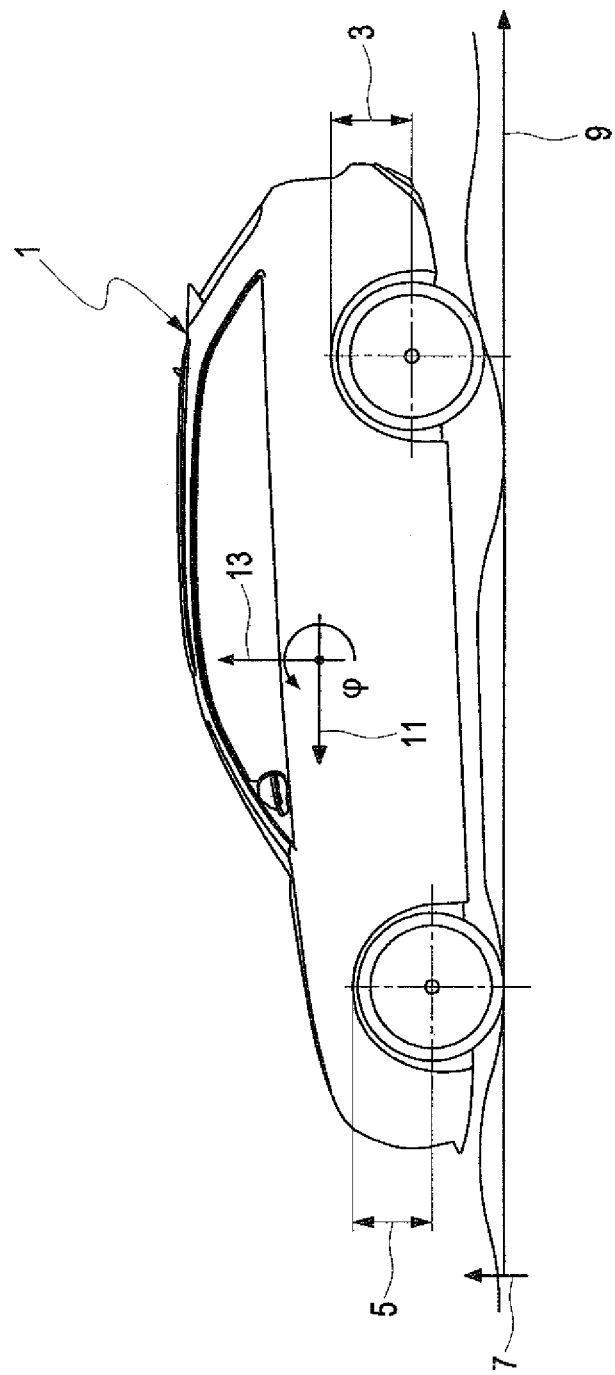
FIG. 1 shows a schematic overview over a possible embodiment of the presented method.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a vehicle 1. The vehicle 1 is equipped with an active body suspension system, i.e., a so-called "active body control". In order to regulate the active body control so that the vehicle 1 remains at a constant vehicle level, i.e., a constant vehicle height $h_{vcl}$ at which a superstructure of the vehicle 1 substantially remains at a same distance to respective wheel carriers of the vehicle 1, an actual value of the distance between the superstructure and respective wheels, i.e., the vehicle height $h_{vcl}$ has to be provided to the active vehicle body suspension system so that the active vehicle body suspension system can actively regulate the distance between the superstructure and the wheel carriers.

This absolute vehicle height $h_{vcl}$ has an initial state and can be changed by a driver request or a regulating system request. This vehicle level is ideally interpretable as fixed value and is therefore temporally constant as stated in the equation (1).

$$h_{vcl} = h_{vcl}(t) = \text{const.} \tag{1}$$

The vehicle height $h_{vcl}$ is interpreted by the active body suspension system as target value and hereby corresponds to an ideal information regarding the actual vehicle height $h_{vcl}$.

When the vehicle 1 drives over an uneven road the road excites a coupled spring-damper-mass system of the active body suspension system to undergo coupled vibrations which causes the actual vehicle height $h_{vcl}$ or the difference between the wheel carrier edge and the tire profile as externally visible variable of the measured vehicle height to fluctuate. For determining the vehicle height $h_{vcl}$ spring travel sensors are used which detect a differential movement between the wheel carrier and the superstructure. From the spring travel sensors of the vehicle 1 conclusions can thus be drawn regarding the wheel-own level of the vehicle 1, i.e., a distance between a respective wheel and the vehicle superstructure as indicated by arrows 3 and 5.

In addition a road profile predetermines a frequency spectrum for respective spring travel sensors as indicated by arrow 7, which frequency spectrum changes in dependence on the speed with which the vehicle 1 moves along the road as indicated by the axis 9 and in dependence on roll movements of the vehicle 1, as indicated by a spatial angle φ and a horizontal axis 11 or a vertical axis 13.

Figure 2:
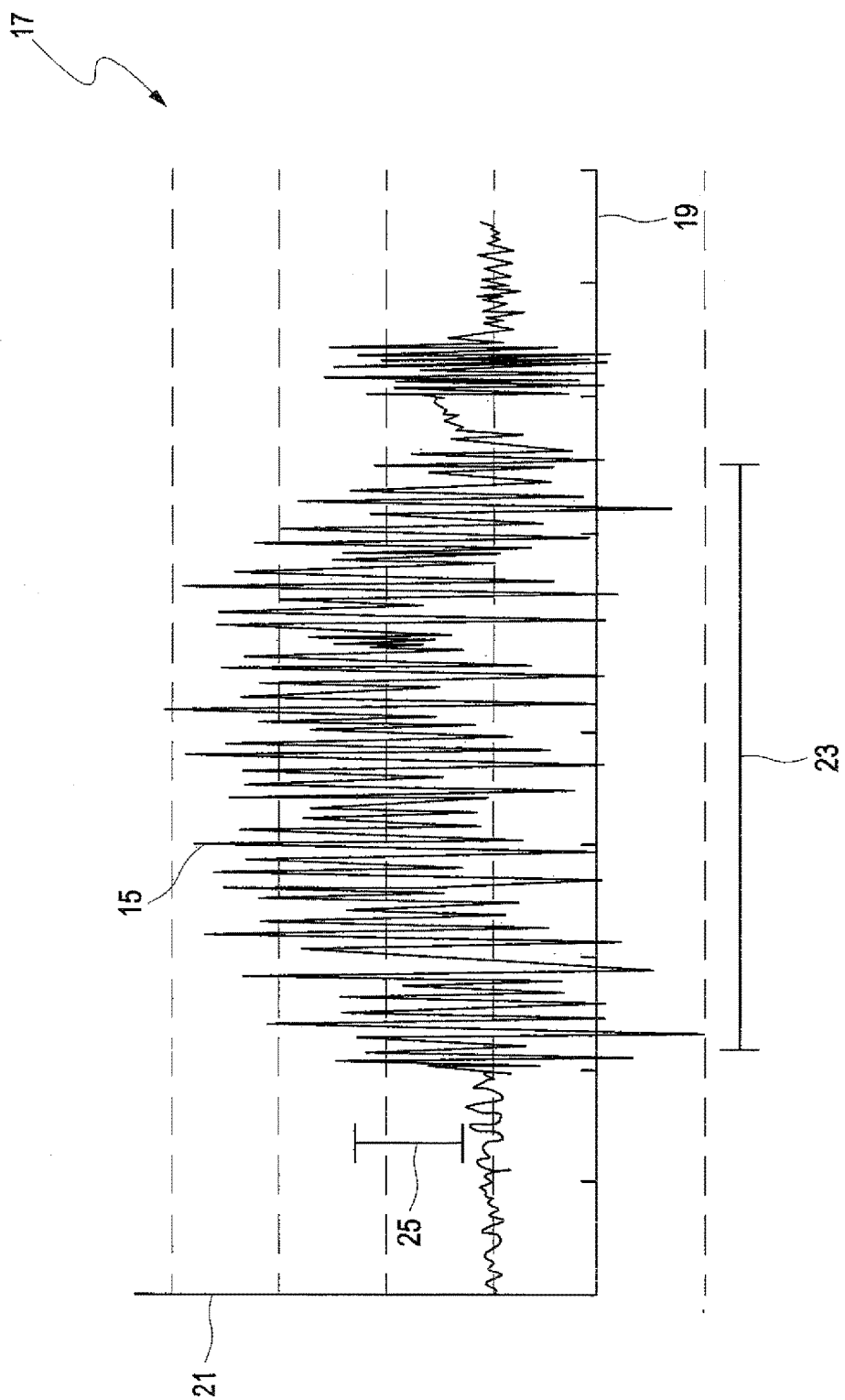
FIG. 2 shows a signal detected by a chassis sensor provided according to a possible embodiment of the presented method.

FIG. 2 shows a frequency spectrum 15 of a signal detected by a spring travel sensor of the vehicle 1, which signal is shown in a diagram 17 which defines a time axis in [s] on the abscissa 19 and an amplitude axis in [mm] on the ordinate 21. The frequency spectrum 15 represents a signal of the body suspension system of the vehicle 1w high signal is very strongly interfered, with a level change of 20 mm between 15 and 35 seconds as indicated by the regions 23 and 25.

In the situation shown in FIG. 2 the vehicle drives on a road with very great profile steps with a speed in the range of 50 km/h appropriate for driving in a city. Hereby a respective wheel fluctuated relative to the superstructure of the vehicle 1 by about 80 millimeters in absolute amplitude. This strong movement is superimposed in the region 25 by a lifting and lowering process of about 20 mm length, which is executed by an air spring of the active body suspension system of the vehicle 1 in the range between 15 and 35 seconds. Because the vibrations of the wheel are superimposed in dependence on the profile steps of the road by the lifting and lowering processes of the air spring of the active body suspension system a determination of the actual vehicle height $h_{vcl}$ via average value formation is not possible.

In order to determine the vehicle height $h_{vcl}$ independent of movements of the air spring of the active body suspension system the presented method provides that an average value free and speed dependent road excitation of the active body suspension system is determined by a high pass filter of low cutoff frequency. For this it is provided that a difference between unfiltered and filtered signals of a respective spring travel sensor of the vehicle 1 is formed which immediately provides an actual and absolute vehicle height $h_{vcl}$. It is in particular provided that the high pass filter is selected in dependence on known properties of the active body suspension system so that the movements caused by the movement so the active body suspension system are effectively extracted by the high pass filter and are then used for calculating the difference, which ultimately gives the vehicle height $h_{vcl}$.

Figure 3:
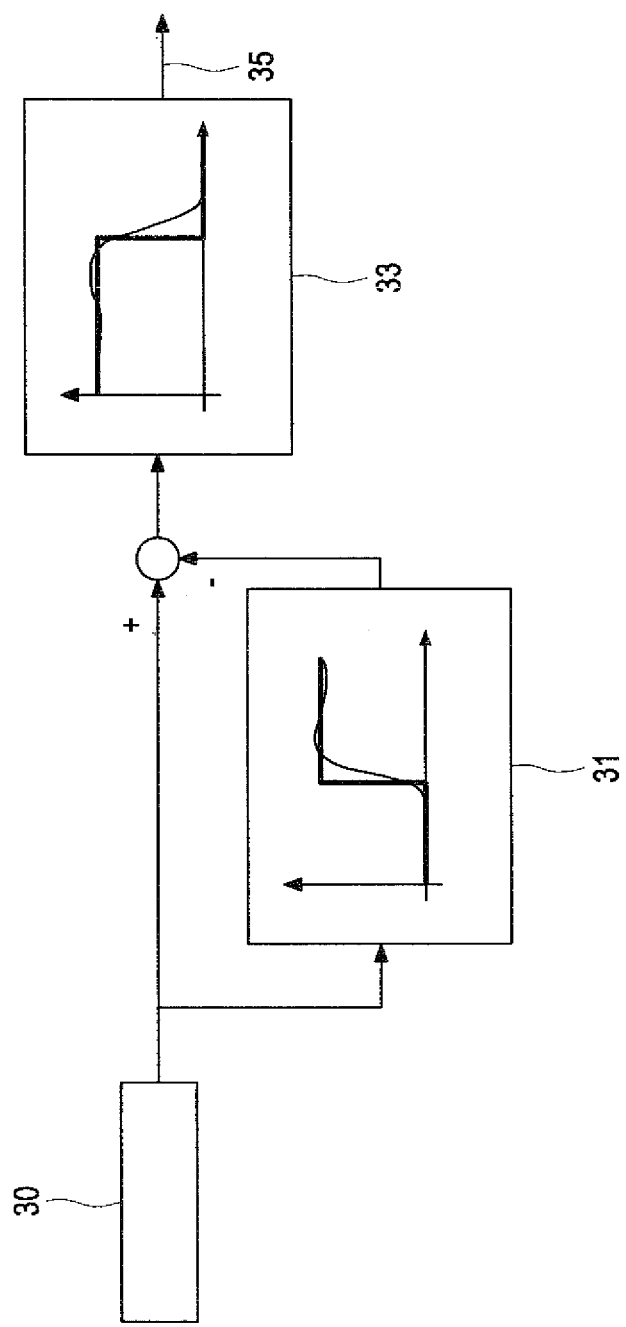
FIG. 3 shows a signal processing according to a possible embodiment of the presented method.

For reducing remaining vibration portions by taking into account a maximally permitted signal delay of a downstream signal processing regulation system a smoothing low-pass filtering can optionally be performed as shown in FIG. 3. In this case a signal detected by a spring travel sensor 30 is filtered via a high-pass filter as described above and indicated by diagram 31. In order to smoothen a signal generated by the high-pass filter and to thereby optimize the signal for provision to further components of the vehicle 1 the signal is fed into a low-pass filter as indicated by diagram 33. The low-pass filter then outputs a smoothed signal from which an actual vehicle level $h_{vcl}$ can be concluded as indicated by arrow 35.

Figure 4:
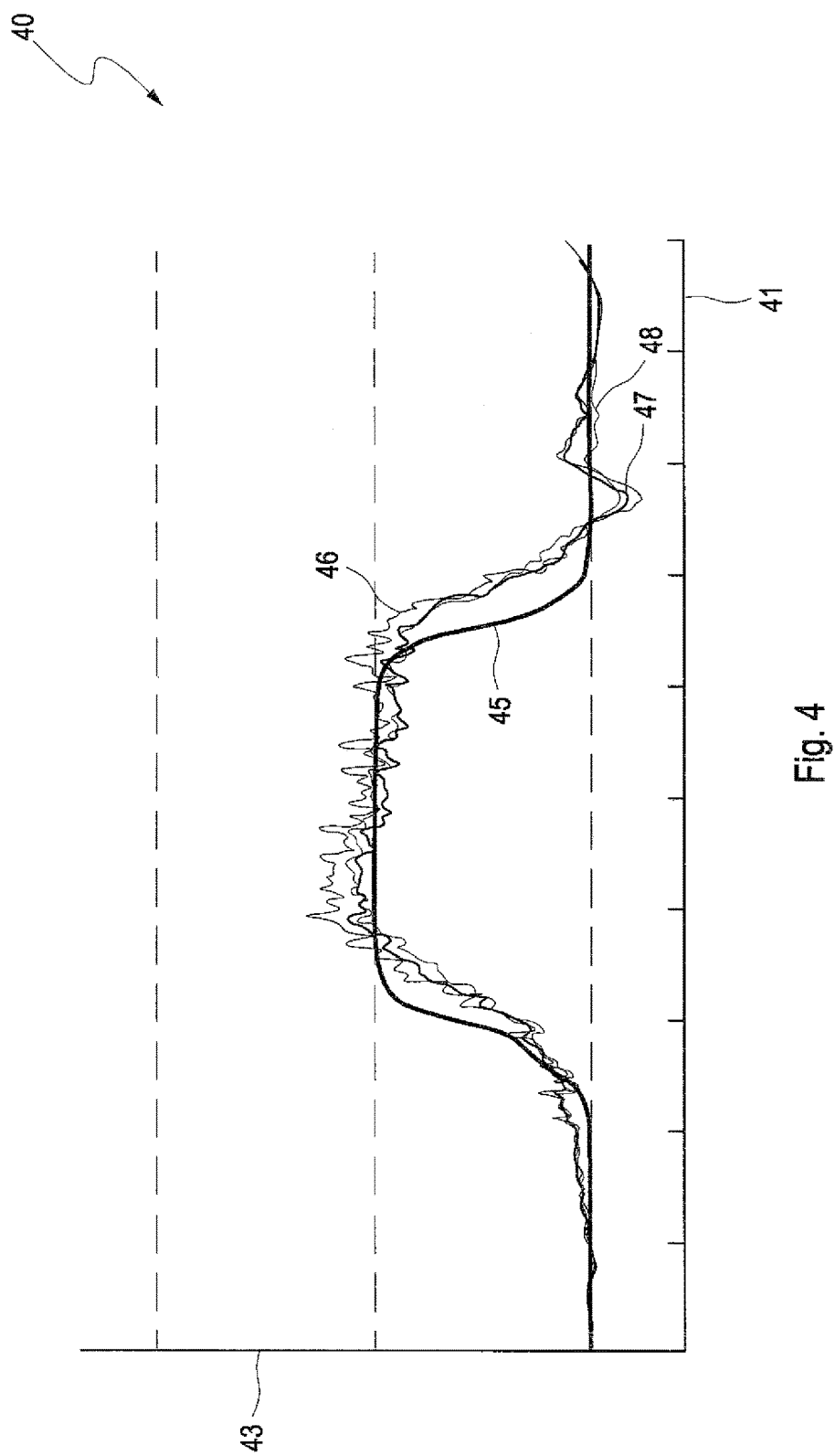
FIG. 4 shows different filter functions according to different possible embodiments of the presented method.

FIG. 4 shows a result of the signal manipulation or reduction by means of different high pass and low pass filters in a diagram 40, which is formed by an abscissa 41 over a time axis in [s] and on an ordinate 43 over an amplitude in [mm]. Depending on the filter construction of the high pass and low pass portions an overestimation or underestimation of a signal amplitude resulting form a respective signal can be observed. In order to correct a potential overestimation or underestimation an adjustment factor (Gain), which is dependent from the respective filter coefficient, can be provided so that the absolute vehicle height $h_{vcl}$ can be optimally and directly outputted.

In FIG. 4 a second degree high-pass filter configuration is used. With this an amplitude damping of low-frequency signal portions with 40 dB per decade can be observed. In a field of development, which takes real-time enabled control devices into account this represents a good compromise between dynamic driving behavior for a fast signal adjustment at manageable processing effort.

The courses 46, 47 and 48 approximate an ideal course 45 of a vehicle height signal. The course 46 shows a filtering based on a Butterworth filter without amplitude adjustment. The course 47 shows a filtering based on a Butterworth filter with amplitude adjustment and a Gain of 0.9. The course 48 shows a filtering based on a Chebyshev filter with a gain of 0.9.

Figure 5:
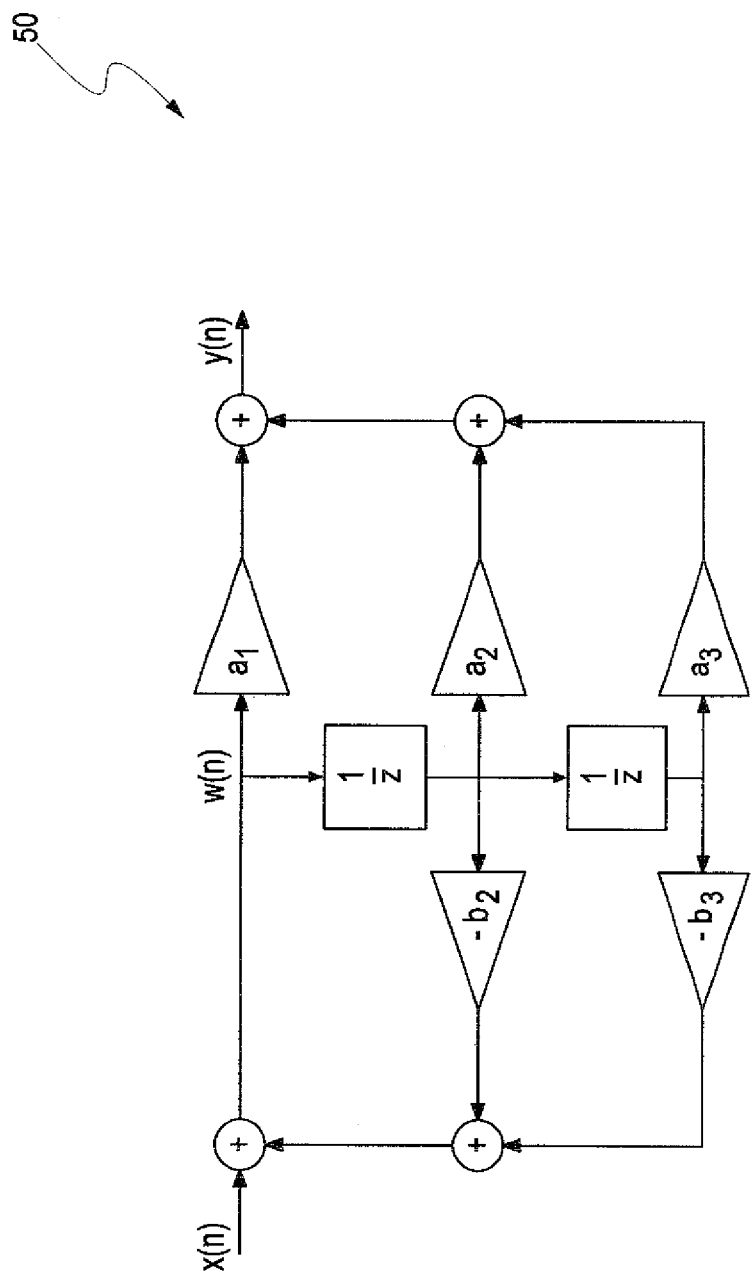
FIG. 5 shows a model based implementation of a filter function according to a possible embodiment of the presented method.

A characteristic filter interpretation is shown in FIG. 5. A circuit diagram 50 shows a model based implementation of a filter of 2. Order a filter behavior, i.e., a behavior as high pass or low-pass filter is determined by respective coefficients.

The second-degree filter implementation has three denominator coefficients and three numerator coefficients of a transfer function. Correspondingly FIG. 5 represents an exemplary implementation of a filter function in which a respective first denominator coefficient is always 1 as is typical for Butterworth, Chebyshev Bessel and other filter configuration methods. Thus b2 and b3 stand for remaining denominator coefficients and a1, a2, a3 for numerator coefficients of an equation (2) of a transfer function.

$$H(s) = \frac{a1 + a2 \cdot s + a3 \cdot s^2}{1 + b2 \cdot s + b3 \cdot s^2} \qquad (2)$$

What is claimed as new and desired to be protected by Letters Patent is set forth in the appended claims and includes equivalents of the elements recited therein:

1. A method for determining an actual level of a vehicle to regulate a distance between a superstructure and a wheel carrier, said method comprising:
   determining an actual level of the vehicle as a function of a distance between the wheel carrier of the vehicle and the superstructure of the vehicle,
   wherein the distance between the wheel carrier and the superstructure is determined by means of a signal detected by at least one chassis sensor, wherein said at least one chassis sensor is a spring travel sensor coupled to a spring damper mass system of an active body suspension, said signal including a first signal portion that corresponds to an own movement of the vehicle, a second signal portion that corresponds to extended unevennesses on a road on which the vehicle actually drives, and a third signal portion that corresponds to an excitation by the road on which the vehicle actually drives;
   filtering the first and second signal portions out of the signal detected by the at least one chassis sensor by means of a filter function;
   calculating the actual level of the vehicle from a difference between the filtered signal without the first and second signal portions and the signal detected by the at least one chassis sensor;
   providing the actual level of the vehicle to the active vehicle body suspension system; and
   actively regulating the distance between the superstructure and the wheel carrier by the active vehicle body suspension system.

2. The method of claim 1, wherein the at least one filter function is selected in dependence on a frequency range of a movement of at least one component of the vehicle.

3. The method of claim 1, wherein from the first and second signal portions that have been filtered out of the signal detected by the at least one chassis sensor frequency portions are selected so that a respectively filtered signal is calculated using a frequency based filter which uses defined frequency portions for calculating a corresponding filtered signal and discards other frequency portions defined signals.

4. The method of claim 1, further comprising smoothing the difference formed between the filtered signal and the signal detected by the at least one chassis sensor by a smoothening function to take a system inertia of a chassis system of the chassis into account.

5. The method of claim 1, further comprising adjusting the at least one filter function by an adjustment factor so that the difference between the filtered signal and the signal detected by the at least one chassis sensor optimally approximates an ideal signal, said adjustment factor provided to correct a potential overestimation or underestimation of the signal amplitude and depending on respective filter coefficients of the at least one filter function.

6. The method of claim 1, wherein the at least one filter function is selected from the group consisting of Butterworth filter, Chebyshev filter, adaptive filter, Wiener filter, Kalman filter, bandpass filter, low pass filter, high-pass filter with low cutoff frequency and high-pass filter.

7. A vehicle, comprising:
a control device configured to determine an actual level of the vehicle via a distance between at least one wheel carrier of the vehicle and a superstructure of the vehicle and to determine the distance by means of a signal detected by at least one chassis sensor, said at least one chassis sensor being a spring travel sensor coupled to a spring damper mass system of an active body suspension,
said signal including a first signal portion which corresponds to an own movement of the vehicle, a second signal portion that corresponds to extended unevennesses on a road on which the vehicle actually drives, and a third signal portion that corresponds to an excitation by a road on which the vehicle actually drives,
said control device being further configured to filter the first and second signal portions out of the signal detected by the at least one chassis sensor by means of at least one filter function and to determine the actual level of the vehicle from a difference between the filtered signal without the first and second signal portions and the signal detected by the at least one chassis sensor and to provide the actual level of the vehicle to a control function of at least one component of the vehicle to regulate the distance between the superstructure and the at least one wheel carrier.

8. The vehicle of claim 7, wherein the control device is further configured to
provide the actual level of the vehicle to a level regulation device for adjusting to a predetermined set point value, in order to correspondingly select at least one lift or lowering speed of the level regulation to be adjusted.

9. A control device for installation in a vehicle, said control device being configured to determine an actual level of the vehicle via a distance between at least one wheel carrier of the vehicle and a superstructure of the vehicle and to determine the distance by means of a signal detected by at least one chassis sensor being a spring travel sensor coupled to a spring damper mass system of an active body suspension, said signal including a first signal portion which corresponds to an own movement of the vehicle, a second signal portion that corresponds to extended unevennesses on a road on which the vehicle actually drives, and a third signal portion that corresponds to an excitation by a road on which the vehicle actually drives,
said control device being further configured
to filter the first and second signal portions out of the signal detected by the at least one chassis sensor by means of at least one filter function and to determine the actual level of the vehicle from a difference between the filtered signal without the first and second signal portions and the signal detected by the at least one chassis sensor and
to provide the actual level of the vehicle to a control function of at least one component of the vehicle, and to regulate the distance between the superstructure and the at least one wheel carrier.

10. The control device of claim 9, wherein the component of the vehicle performs a function selected from the group consisting of air suspension of the chassis, roll stabilization and spring mount adjustment.

* * * * *